(12) United States Patent
Yilma et al.

(10) Patent No.: US 11,528,102 B1
(45) Date of Patent: Dec. 13, 2022

(54) BUILT-IN-SELF-TEST AND CHARACTERIZATION OF A HIGH SPEED SERIAL LINK RECEIVER

(71) Applicant: International Business Machines Corporation, Armonk, NY (US)

(72) Inventors: Dereje Yilma, Rochester, MN (US); Nathan Ross Blanchard, Austin, TX (US); Erik English, Salt Point, NY (US); Chad Andrew Marquart, Austin, TX (US); Glen A. Wiedemeier, Austin, TX (US); Jeffrey Kwabena Okyere, Carrollton, TX (US); James Crugnale, Austin, TX (US); Christopher Steffen, Rochester, MN (US); Vikram B Raj, Austin, TX (US); Michael Wayne Harper, Austin, TX (US); Venkat Harish Nammi, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/405,171

(22) Filed: Aug. 18, 2021

(51) Int. Cl.
*H04L 1/00* (2006.01)
*H04L 1/24* (2006.01)
*H04L 7/027* (2006.01)

(52) U.S. Cl.
CPC ............ *H04L 1/244* (2013.01); *H04L 1/0045* (2013.01); *H04L 1/246* (2013.01); *H04L 7/027* (2013.01)

(58) Field of Classification Search
None
See application file for complete search history.

(56) References Cited

U.S. PATENT DOCUMENTS

| | | |
|---|---|---|
| 6,816,987 B1 | 11/2004 | Olson et al. |
| 7,271,751 B2 | 9/2007 | Peterson et al. |
| 7,315,574 B2 | 1/2008 | Hafed et al. |
| 7,363,563 B1 | 4/2008 | Hissen et al. |
| 7,464,307 B2 | 12/2008 | Nejedlo et al. |
| 7,613,237 B1 | 11/2009 | Talbot |

(Continued)

FOREIGN PATENT DOCUMENTS

| | | |
|---|---|---|
| EP | 1269687 A2 | 1/2003 |
| EP | 1814234 B1 | 1/2011 |
| EP | 1908205 B1 | 9/2011 |

OTHER PUBLICATIONS

Kim et al., "An Effective Defect-Oriented BIST Architecture for High-Speed Phase-Locked Loops," Proceedings 18th IEEE VLSI Test Symposium, 2000, pp. 231-236.

(Continued)

*Primary Examiner* — Mujtaba M Chaudry
(74) *Attorney, Agent, or Firm* — Cantor Colburn LLP; Kelsey M. Skodje

(57) ABSTRACT

Aspects of the invention include a driver arranged at a stand-alone receiver that is configured to receive a binary sequence from a pseudorandom binary sequence (PRBS) generator arranged at the receiver. The driver is configured to adjust the signal characteristics of the binary sequence to simulate channel loss at the receiver. The driver is further configured to output the adjusted binary sequence to a downstream data path of the receiver to enable the receiver to perform a self-test.

20 Claims, 5 Drawing Sheets

(56) References Cited

U.S. PATENT DOCUMENTS

| | | |
|---|---|---|
| 7,756,197 B1 | 7/2010 | Ferguson et al. |
| 7,912,166 B2 | 3/2011 | Hsu et al. |
| 8,228,972 B2 | 7/2012 | Tonietto et al. |
| 8,598,898 B2 | 12/2013 | Sul et al. |
| 8,811,458 B2 | 8/2014 | Kong et al. |
| 8,989,246 B2 | 3/2015 | Wu |
| 9,176,188 B2 | 11/2015 | Chakraborty et al. |
| 2002/0125933 A1* | 9/2002 | Tamura ............... G11C 7/1069 327/390 |
| 2004/0267479 A1* | 12/2004 | Querbach ........ G01R 31/31853 714/E11.169 |
| 2007/0047635 A1* | 3/2007 | Stojanovic ........ H04L 25/03006 375/229 |
| 2009/0105978 A1 | 4/2009 | Schuttert et al. |
| 2009/0302887 A1* | 12/2009 | Kwasniewski .... H03K 19/1778 326/38 |
| 2013/0099702 A1* | 4/2013 | Williams ............... H05B 47/18 315/363 |
| 2013/0145212 A1 | 6/2013 | Hsu et al. |
| 2016/0329751 A1* | 11/2016 | Mach ..................... H02J 50/20 |
| 2020/0200853 A1* | 6/2020 | Horimoto ................ G01S 3/48 |

OTHER PUBLICATIONS

Satyacathi et al., "Implementation of BIST Technique in UART Serial communication," IOSR Journal of VLSI and Signal Processing. vol. 4, Issue 5, Ver. 11, pp. 21-29.

List of IBM Patents or Patent Applications Treated as Related; Date Filed: Aug. 18, 2021, 2 pages.

Blanchard et al., "Self-Contained Built-In Self-Test Circuit With Phase-Shifting Abilities for High-Speed Receivers," U.S. Appl. No. 17/405,173, filed Aug. 18, 2021.

* cited by examiner

BUILT-IN-SELF-TEST AND CHARACTERIZATION OF A HIGH SPEED SERIAL LINK RECEIVER

BACKGROUND

The present invention generally relates to integrated circuits, and more specifically, to integrated circuits configured for performing a built-in-self-test and characterization of a high speed serial link receiver that supports multiple I/O standards with various channel loss characteristics.

An integrated circuit is an electronic circuit formed from a collection of semiconductor devices. Semiconductor devices are fabricated through a precise series of steps to produce semiconductor devices assembled for an integrated circuit. As part of the fabrication process, a semiconductor device is tested during the wafer fabrication, wafer probing, packaging, and final phases of fabrication. The testing process helps determine the reliability of the semiconductor devices and improves the fabrication process.

SUMMARY

Embodiments of the present invention are directed to a driver configured to perform a built-in-self-test and characterization of a high speed serial link receiver that supports multiple I/O standards with various channel loss characteristics. A non-limiting example of the driver is arranged at a stand-alone receiver that is configured to receive a binary sequence from a pseudorandom binary sequence (PRBS) generator arranged at the receiver. The driver is configured to adjust the signal characteristics of the binary sequence to simulate channel loss at the receiver. The driver is further configured to output the binary sequence to a downstream data path of the receiver to enable the receiver to perform a self-test.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a self-contained receiver that includes a built-in self-test (BIST) path for generating test patterns locally and performing self-tests. The BIST path includes a driver with a programmable AC response mode for covering different channel loss conditions and a programmable common mode for stressing the receiver input across a range of input common mode conditions.

A built-in self-test (BIST) path includes hardware and software features that are included in an integrated circuit to allow the circuit to perform a self-test. Contemporary systems generate binary test sequences at a transmitter side of a system, then transmit the test sequences to a receiver side of the system to perform a self-test. Therefore, in order to perform the self-test, the binary test sequence generating functionality of the transmitter side needs to be tested prior to testing the receiver. Furthermore, contemporary receivers lack the functionality to locally generate test patterns to cover channel loss characteristics or stress the receiver input across a range of input common mode conditions.

Figure 1:
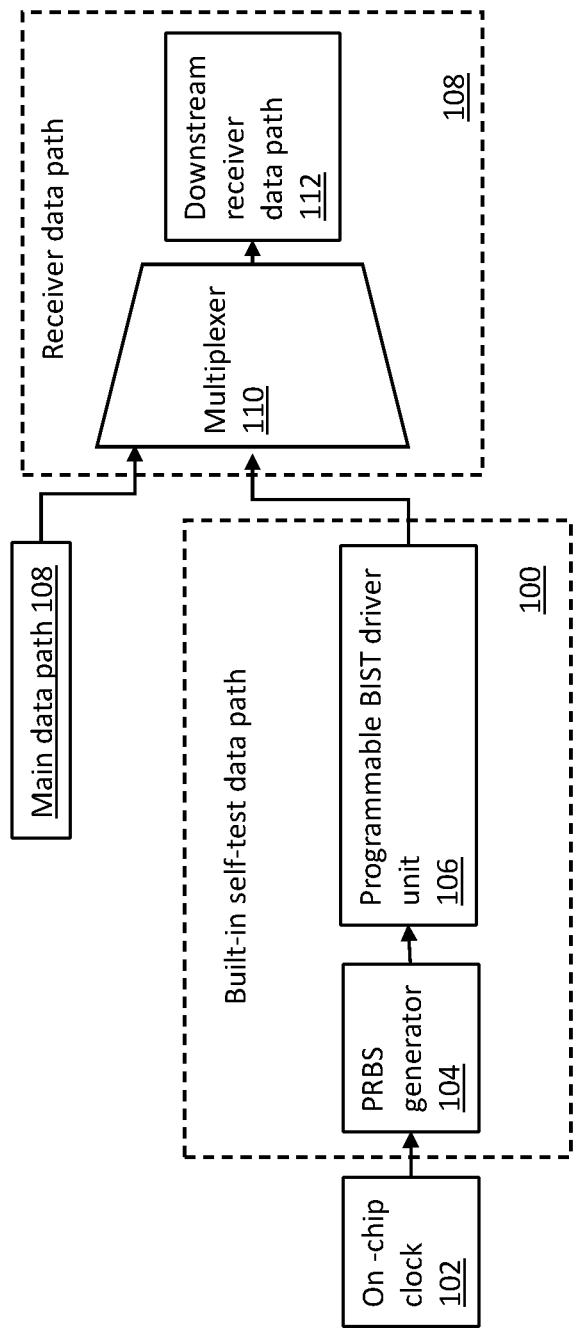
FIG. 1 illustrates a system for built-in-self-test and characterization of a high speed serial link receiver according to one or more embodiments of the present invention.

One or more embodiments of the present invention address one or more of the above-described shortcomings by providing a self-contained receiver with a BIST path that can generate test patterns locally for self-testing. Therefore, the receiver can generate test patterns and adjust the signal characteristics of the test patterns to perform a self-test without having to wait for a transmitter to be tested. Furthermore, the BIST path further includes a driver that can adjust AC/DC common mode signal characteristics of a binary test sequence to simulate different channel loss conditions and stressing the receiver across a range of input common mode conditions. Furthermore, as the test sequences with the adjusted signal characteristics are generated at the receiver, the receiver can perform a self-test while on a wafer, and prior to the wafer being sliced into individual dies Referring to FIG. 1, a built-in self-test (BIST) path of a receiver (hereinafter, "BIST path 100") according to one or more embodiments of the present invention is shown. The BIST path 100 includes a pseudorandom binary sequence (PRBS) generator 104 for generating a binary test sequence. The BIST path 100 further includes a programmable built-in-self-test (BIST) driver unit 106 for receiving the binary test sequence and modifying the binary test sequence to match a desired test protocol. The programmable BIST driver unit 106 is programmable to control an AC/DC common mode signal characteristics of a binary test sequence. This enables the BIST path 100 to test different channel loss conditions and to stress the receiver input across a range of input common mode conditions.

The pseudorandom binary sequence (PRBS) generator 104 is a circuit that applies an algorithm to output a known and reproducible binary test sequence. The PRBS generator 104 receives a clock signal from the local on-chip clock 102. The clock signal drives the PRBS generator 104 to output the binary test sequence. In some embodiments of the present invention, the BIST path 100 further includes a phase rotator (not shown). The phase rotator receives a clock signal from the local on-chip clock 102, and shifts a phase of the clock signal. The phase rotator transmits the shifted clock signal to the PRBS generator 104. In this instance, the shifted clock signal drives the PRBS generator 104 to output the binary test sequence The programmable BIST driver unit 106 includes hardware and software components that permits it to transmit desired test signals to the receiver main data path 108. The programmable BIST driver unit 106 can adjust the alternating current (AC) and direct current (DC) common mode signal characteristics of the received binary test patterns. The AC response mode is for outputting test patterns in the form of an AC response to test different channel loss conditions. As electrical signals travel through channels, signal attenuation can occur at the receiver. If the signal power or amplitude is reduced to a certain level, the receiver can exhibit defects, such as bit loss during a decoding process. The DC programmable common mode outputs test patterns with varying common mode signals to test the receiver's input across a range of input common mode conditions. Input/output standards define link and signal parameters at the input/output pins of different devices. For example, I/O standards can define input voltages, output voltages, input buffer types, and output buffer types. Therefore, the programmable BIST driver unit 106 can be programmed to propagate test signals that span a range of common-mode voltages according to the standards of different links and signals.

The programmable BIST driver unit 106 transmits data downstream to a multiplexer 110 of the receiver main data path 108. The multiplexer 110 is in operable communication with a controller (not shown), which determines whether inputs from the receiver main data path 108 or inputs from the programmable BIST driver unit 106 should be passed through the multiplexer 110. If the receiver is an operating mode (i.e., normal functioning mode) the controller selects inputs from the receiver main data path 108 to pass through the multiplexer 110. If the receiver is in a test mode, the controller selects the data from the programmable BIST driver unit 106 to pass through the multiplexer 110. The multiplexer 110 outputs data to the downstream receiver data path 112, which includes a collection of functional units for performing self-testing operations (e.g., output response analyzers and associated chip logic).

The downstream receiver data path 112 includes output response analyzers for analyzing a receiver response to the test signal generated by the programmable BIST driver unit 106. The output response analyzers collect output response generated in response to the test signal outputted by the programmable BIST driver unit 106 via the multiplexer. The output response analyzers then retrieve a reference pattern from memory. The reference pattern is a pattern that assists the output response analyzers whether the receiver has a defect or achieves performance requirements. For example, a defect can include a pin failure. Performance requirements include whether the receiver can achieve a link error target rate. The output response analyzers compare the reference response to the output response and determine whether the receiver has a defect or cannot achieve a performance requirement.

Figure 2:
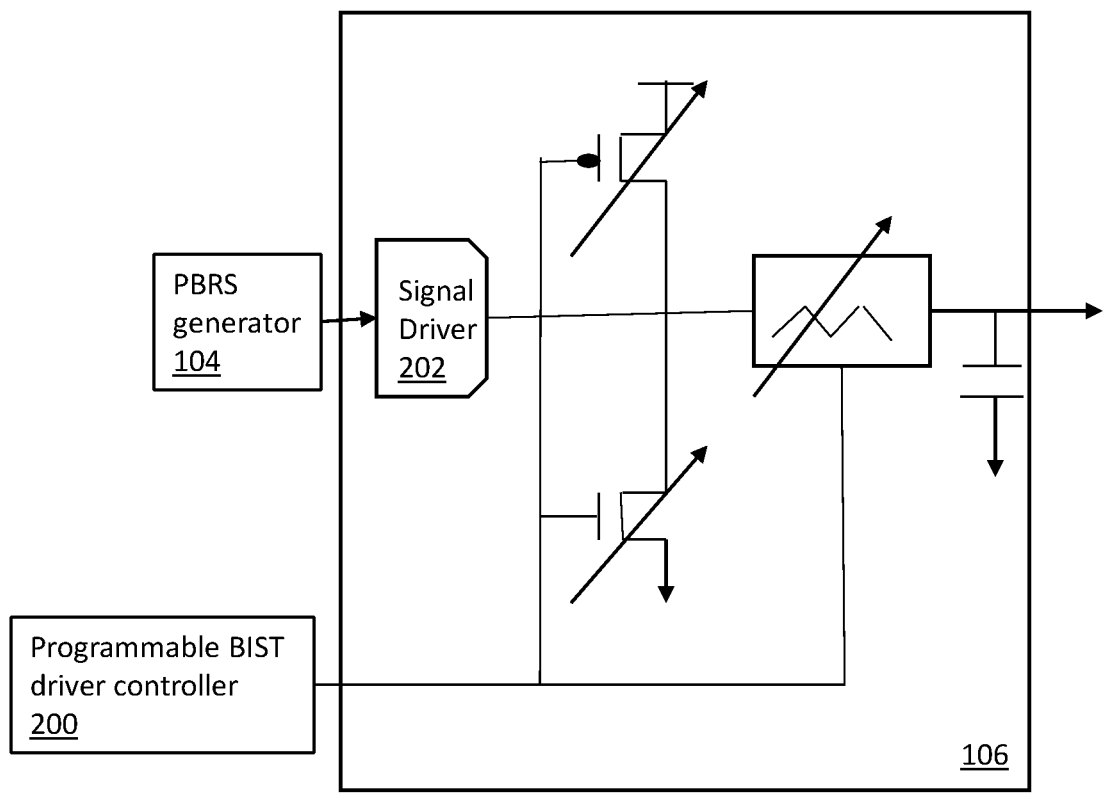
FIG. 2 illustrates a programmable built-in self-test driver according to one or more embodiments of the present invention.

Referring to FIG. 2, a programmable BIST driver 106 according to one or more embodiments of the present invention. A programmable built-in self-test (BIST) driver controller 200 determines the programmable AC/DC common mode of the programmable BIST driver unit 106 is an AC response mode or in a common mode. The BIST driver controller 200 further controls the test patterns and the signal characteristics based on the desired channel loss characteristics to be tested, I/O voltages, and device standards. The test patterns being the sequence of logical ones and zeros. The signal characteristics being the electrical (alternating current/direct current) characteristics of the test patterns, for example, signal amplitude or common mode. The PRBS generator 104 transmits a binary test sequence to a signal driver 202 which passes the signal through the programmable BIST driver unit 106. The programmable BIST driver unit 106 outputs a test signal based on the instructions of the BIST driver controller 200.

Figure 3:
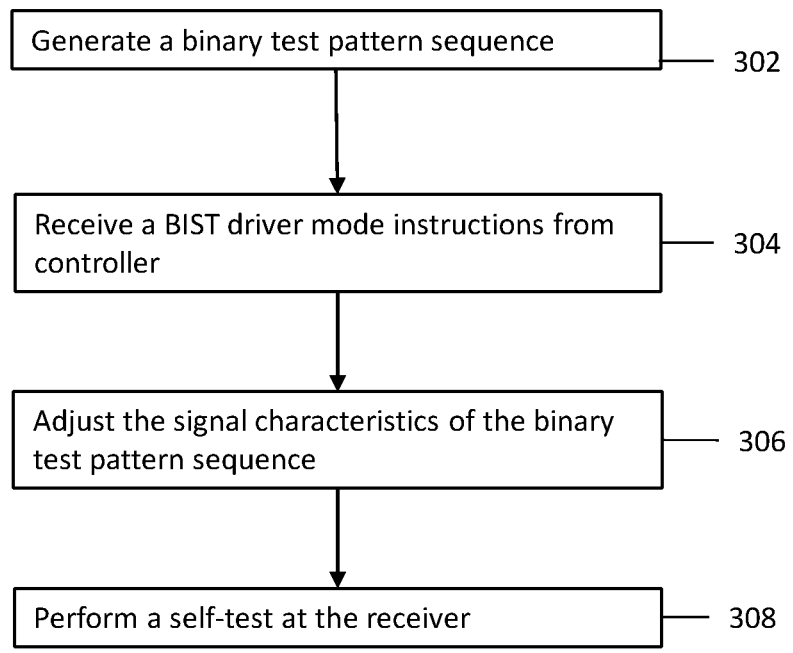
FIG. 3 illustrates a flow diagram for a built-in-self-test and characterization of a high speed serial link receiver according to one or more embodiments of the present invention.
Figure 3:
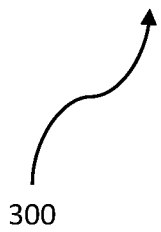

Referring to FIG. 3, a process flow 300 for performing a self-test at a high speed serial link receiver is shown. At block 302, a BIST path 100 of a receiver generates a binary test sequence for self-testing the receiver. In some embodiments of the present invention, a local on-chip clock 102 transmits a clock signal to a pseudorandom binary sequence (PRBS) generator 104. The PRBS generator 104 outputs a binary test sequence and transmits it to a programmable BIST driver unit 106.

At block 304, the programmable BIST driver unit 106 receives the desired signal characteristics instructions from the BIST driver controller 200. Based on the instructions from the BIST driver controller 200, the programmable BIST driver unit 106 adjusts the signal characteristics of the binary test sequence to match desired signal characteristics at block 306. The BIST driver unit 106 then outputs the adjusted binary test sequence in order to simulate different desired channel loss conditions and stress the receiver input across a desired range of input common mode conditions.

At block 310, the receiver performs a self-test using the outputted test signal from the programmable BIST driver unit 106. The receiver collects an output response and transmits the response to a comparator circuit. The receiver further collects a reference response from memory and transmits the reference response to the comparator circuit. The comparator circuit compares the output response to the reference response and determines whether the receiver has a defect or cannot achieve a performance requirement.

Figure 4:
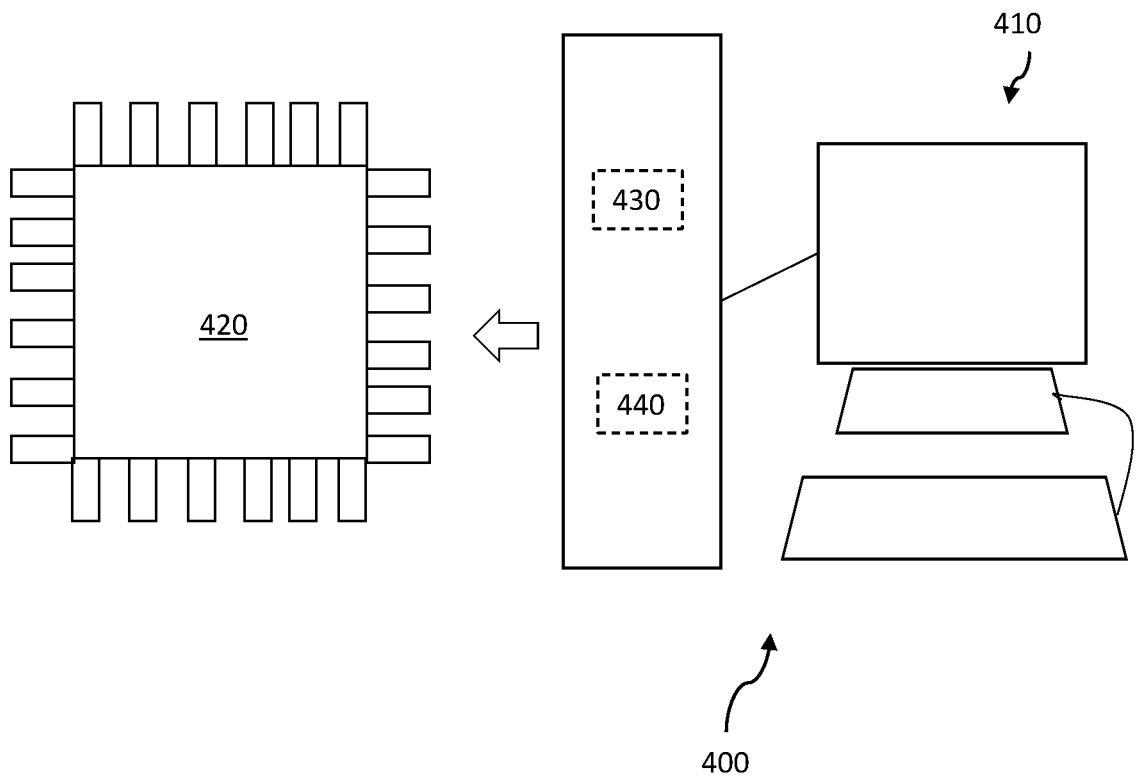
FIG. 4 illustrates a system used to generate the design used to fabricate an integrated circuit according to one or more embodiments of the present invention.

FIG. 4 is a block diagram of a system 400 to fabricate/design that performs a built-in-self-test and characterization of a high speed serial link receiver that supports multiple I/O standards with various channel loss characteristics according to embodiments of the invention. The system 400 includes processing circuitry 410 used to generate the design that is ultimately fabricated into an integrated circuit 420. The steps involved in the fabrication of the integrated circuit 420 are well-known and briefly described herein. Once the physical layout is finalized, based, in part, on performing a built-in-self-test and characterization of a high speed serial link receiver that supports multiple I/O standards with various channel loss characteristics according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 5.

Figure 5:
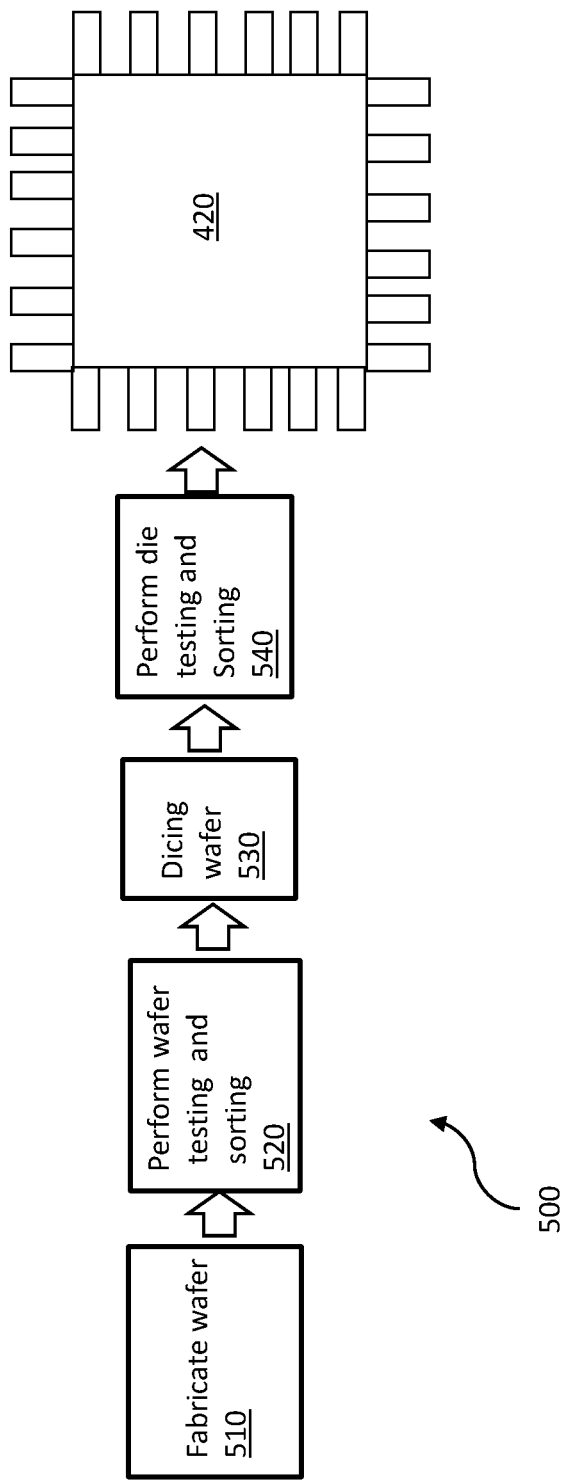
FIG. 5 illustrates a process flow of a method of fabricating an integrated circuit according to one or more embodiments of the present invention.

Referring to FIG. 5, a process flow 500 of a method of fabricating the integrated circuit is shown according to exemplary embodiments of the invention. Once the physical design data is obtained, based, in part, on with a self-contained built-in self-test circuit with phase shifting abilities, the integrated circuit 420 can be fabricated according to known processes that are generally described with reference to FIG. 5. Generally, a wafer with multiple copies of the final design is fabricated and cut (i.e., diced) such that each die is one copy of the integrated circuit 420. At block 510, the processes include fabricating a wafer, including using masks to perform photolithography and etching. At block 520, performing wafer-level testing and wafer sorting. At block 530, dicing the wafer, and packaging functional dies. At block 540, performing die-level testing and sorting.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a driver arranged at a receiver, a binary sequence from a pseudorandom binary sequence (PRBS) generator arranged at the receiver of an integrated circuit;
   adjusting, by the driver arranged at the receiver, the signal characteristics of the binary sequence to simulate channel loss at the receiver; and
   outputting, by the driver arranged the receiver, the adjusted binary sequence to a downstream data path of the receiver.

2. The computer-implemented method of claim 1, wherein the method further comprises performing a self-test on the receiver using the adjusted binary sequence.

3. The computer-implemented method of claim 1, wherein the method further comprises generating, by the PRBS generator, the binary sequence.

4. The computer-implemented method of claim 1, wherein the method further comprises receiving, by the PRBS generator, a clock signal from an on-chip clock.

5. The computer-implemented method of claim 1, wherein the method further comprises outputting the adjusted binary sequence to a multiplexer.

6. The computer-implemented method of claim 1, wherein the adjusted binary sequence is modeled to stress the receiver input across a range of input common mode conditions.

7. The computer-implemented method of claim 1, wherein the signal characteristics comprise alternating current characteristics and common mode characteristics.

8. A system comprising:
   a driver arranged at a receiver;
   a memory having computer readable instructions; and
   one or more processors for executing the computer readable instructions, the computer readable instructions controlling the one or more processors to perform operations comprising:
   receiving, by the driver, a binary sequence from a pseudorandom binary sequence (PRBS) generator arranged at the receiver of an integrated circuit;
   adjusting, by the driver, the signal characteristics of the binary sequence to simulate channel loss at the receiver; and
   outputting, by the driver, the adjusted binary sequence to a downstream data path of the receiver.

9. The system of claim 8, wherein the operations further comprise performing a self-test on the integrated circuit based on the alternating current response.

10. The system of claim 8, wherein the operations further comprise generating, by the PRBS generator, the binary sequence.

11. The system of claim 8, wherein the operations further comprise receiving, by the PRBS generator, a clock signal from an on-chip clock.

12. The system of claim 8, wherein the operations further comprise outputting the AC response to a multiplexer.

13. The system of claim 8, wherein the AC response is modeled to stress the receiver input across a range of input common mode conditions.

14. The system of claim 8, wherein the signal characteristics comprise alternating current characteristics and common mode characteristics.

15. A computer program product comprising a computer readable storage medium having program instructions embodied therewith, the program instructions executable by a processor to cause the processor to perform operations comprising:
   receiving, by the driver, a binary sequence from a pseudorandom binary sequence (PRBS) generator arranged at the receiver of an integrated circuit;
   adjusting, by the driver, the signal characteristics of the binary sequence to simulate channel loss at the receiver; and
   outputting, by the driver, the adjusted binary sequence to a downstream data path of the receiver.

16. The computer program product of claim 15, wherein the operations further comprise performing a self-test on the integrated circuit based on the alternating current response.

17. The computer program product of claim 15, wherein the operations further comprise generating, by the PRBS generator, the binary sequence.

18. The computer program product of claim 15, wherein the operations further comprise receiving, by the PRBS generator, a clock signal from an on-chip clock.

19. The computer program product of claim 15, wherein the operations further comprise outputting the AC response to a multiplexer.

20. The computer program product of claim 15, wherein the AC response is modeled to stress the receiver input across a range of input common mode conditions.

* * * * *